(12) United States Patent
Ye et al.

(10) Patent No.: US 9,601,262 B2
(45) Date of Patent: Mar. 21, 2017

(54) COUPLED INDUCTOR AND POWER CONVERTER

(71) Applicant: Huawei Technologies Co., Ltd., Shenzhen, Guangdong (CN)

(72) Inventors: Fei Ye, Shanghai (CN); Yunfeng Liu, Shanghai (CN); Dianbo Fu, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 123 days.

(21) Appl. No.: 14/584,940

(22) Filed: Dec. 29, 2014

(65) Prior Publication Data

US 2015/0170822 A1    Jun. 18, 2015

Related U.S. Application Data

(63) Continuation of application No. PCT/CN2014/082141, filed on Jul. 14, 2014.

(30) Foreign Application Priority Data

Dec. 12, 2013  (CN) .......................... 2013 1 0684601

(51) Int. Cl.
  *H01F 38/02*   (2006.01)
  *H02M 7/487*   (2007.01)
  *H02M 7/49*    (2007.01)

(52) U.S. Cl.
  CPC .......... *H01F 38/023* (2013.01); *H02M 7/487* (2013.01); *H02M 7/49* (2013.01); *H01F 2038/026* (2013.01)

(58) Field of Classification Search
  CPC .......... H01F 27/28; H01F 27/29; H01F 27/24; H02M 7/49; H02M 7/487
  (Continued)

(56) References Cited

U.S. PATENT DOCUMENTS 4,789,845 A * 12/1988 Reddy ...................... H03H 7/48
                                                          333/100
5,208,739 A *  5/1993 Sturgeon ............... H02M 3/337
                                                          363/16
(Continued)

FOREIGN PATENT DOCUMENTS

CN         2065354 U    11/1990
CN         1841582 A    10/2006
(Continued)

OTHER PUBLICATIONS

Search report from STIC EIC 2800 searcher John DiGeronimo.*

*Primary Examiner* — Timothy J Dole
*Assistant Examiner* — Htet Z Kyaw

(57) ABSTRACT

A coupled inductor and a power converter includes at least two input ends, an output end, a common magnetic core, at least two first windings, and at least two second windings. The common magnetic core includes at least two magnetic cylinders, and the number of the at least two magnetic cylinders corresponds to the number of the at least two input ends; and one first winding and one second winding are twined in parallel on each cylinder among the at least two magnetic cylinders, and the first windings and the second windings on the at least two magnetic cylinders are mutually connected between the at least two input ends and the output end to form mutually coupled inductances and when currents that flow into the at least two input ends are equal, make the first winding and the second winding on each cylinder generate opposite magnetic potentials.

11 Claims, 6 Drawing Sheets

(58) Field of Classification Search
USPC .......................................................... 363/132
See application file for complete search history.

(56) References Cited

U.S. PATENT DOCUMENTS

| | | | | |
|---|---|---|---|---|
| 5,790,005 | A * | 8/1998 | Santi | H01F 3/14 335/296 |
| 6,362,986 | B1 * | 3/2002 | Schultz | H02M 3/158 363/132 |
| 6,388,896 | B1 * | 5/2002 | Cuk | H02M 3/1582 363/16 |
| 6,549,436 | B1 * | 4/2003 | Sun | H02M 3/337 363/44 |
| 7,468,649 | B2 * | 12/2008 | Chandrasekaran | H01F 27/38 323/358 |
| 8,004,867 | B2 * | 8/2011 | Nakahori | H02M 1/34 363/17 |
| 8,704,500 | B2 * | 4/2014 | Xiao | H02M 3/1584 323/272 |
| 8,836,461 | B2 * | 9/2014 | Li | H01F 17/0006 336/212 |
| 8,975,995 | B1 * | 3/2015 | Ikriannikov | H01F 3/10 336/200 |
| 2004/0233690 | A1 * | 11/2004 | Ledenev | H02M 3/1584 363/133 |
| 2006/0071649 | A1 | 4/2006 | Schrom et al. | |
| 2006/0220777 | A1 | 10/2006 | Nakahori | |
| 2007/0258273 | A1 | 11/2007 | Engelage | |
| 2007/0279022 | A1 * | 12/2007 | Chen | H02M 3/1584 323/272 |
| 2008/0239759 | A1 * | 10/2008 | Nakahori | H01F 27/2804 363/20 |
| 2012/0319478 | A1 * | 12/2012 | Gentchev | H02M 1/14 307/28 |
| 2013/0155747 | A1 * | 6/2013 | Wang | H02M 7/487 363/132 |
| 2013/0176014 | A1 * | 7/2013 | Guan | G05F 3/08 323/311 |
| 2013/0229831 | A1 | 9/2013 | Barnette et al. | |

FOREIGN PATENT DOCUMENTS

| | | |
|---|---|---|
| CN | 101069338 A | 11/2007 |
| CN | 101145477 A | 3/2008 |
| CN | 101507078 A | 8/2009 |
| CN | 201298441 Y | 8/2009 |
| CN | 201498341 U | 6/2010 |
| CN | 101944839 A * | 1/2011 |
| CN | 201812650 U | 4/2011 |
| CN | 102074331 A * | 5/2011 |
| CN | 102074331 A | 5/2011 |

* cited by examiner

COUPLED INDUCTOR AND POWER CONVERTER

CROSS-REFERENCE TO RELATED APPLICATION

This application is a continuation of International Application No. PCT/CN2014/082141, filed on Jul. 14, 2014, which claims priority to Chinese Patent Application No. 201310684601.4, filed on Dec. 12, 2013, both of which are hereby incorporated by reference in their entireties.

TECHNICAL FIELD

The present invention relates to the field of circuits, and in particular, to a coupled inductor and a power converter.

BACKGROUND

Multi-level parallel converters are now in wide use. By using the parallel interleaving connection technique, a multi-level parallel converter can reduce output ripple currents and increase an output switch frequency, and therefore can reduce output inductance, which in turn reduces a size and cost of an inductor.

For example, a five-level power converter with a two-phase coupled inductor is in use; when a common mode current flows through coils on two magnetic cylinders of the coupled inductor, because magnetic fluxes generated by the coils on the two magnetic cylinders are in opposite directions, a common mode magnetic flux in upper and lower magnetic yokes is zero and the magnetic fluxes in the two magnetic cylinders generate a very high common mode magnetic potential, so that a magnetic leakage occurs in the air, and the magnetic leakage caused by the common mode current cannot be ignored.

When a high common mode current flows through, a large magnetic flux leakage exists on the coupled inductor, and the magnetic flux leakage causes an eddy current loss in a winding and causes a stray loss in a metal part outside the winding. In addition, the magnetic flux leakage further affects normal running of a surrounding magnetic component such as a Hall effect sensor or a current transformer (current transformer, CT). Therefore, it has become an immediate challenge to reduce the magnetic leakage of the coupled inductor.

SUMMARY

Embodiments of the present invention provide a coupled inductor and a power converter, which can reduce a magnetic leakage of the coupled inductor.

According to a first aspect, a coupled inductor is provided, including: at least two input ends, an output end, a common magnetic core, at least two first windings, and at least two second windings, where the common magnetic core includes at least two magnetic cylinders, and the number of the at least two magnetic cylinders corresponds to the number of the at least two input ends; and one first winding and one second winding are twined in parallel on each cylinder among the at least two magnetic cylinders, and the first windings and the second windings on the at least two magnetic cylinders are mutually connected between the at least two input ends and the output end to form mutually coupled inductances and when currents that flow into the at least two input ends are equal, make the first winding and the second winding on each cylinder generate opposite magnetic potentials.

With reference to the first aspect, in a first possible implementation, the at least two magnetic cylinders include a first cylinder and a second cylinder, and the at least two input ends include a first input end and a second input end, where a first winding on the first cylinder and a first winding on the second cylinder are connected in series between the second input end and the output end, and a second winding on the first cylinder and a second winding on the second cylinder are connected in series between the first input end and the output end.

With reference to the first possible implementation, in a second possible implementation, a first end of the first winding on the first cylinder is connected to a second end of the first winding on the second cylinder, a second end of the first winding on the first cylinder is connected to the output end, a first end of the second winding on the first cylinder is connected to a second end of the second winding on the second cylinder, a second end of the second winding on the first cylinder is connected to the first input end, a first end of the first winding on the second cylinder is connected to the second input end, a first end of the second winding on the second cylinder is connected to the output end, and dotted terminals of the first end of the first winding and the first end of the second winding on the first cylinder are the first end of the first winding and the first end of the second winding on the second cylinder.

With reference to the first possible implementation, in a third possible implementation, a first end of the first winding on the first cylinder is connected to the output end, a second end of the first winding on the first cylinder is connected to a second end of the first winding on the second cylinder, a first end of the second winding on the first cylinder is connected to the first input end, a second end of the second winding on the first cylinder is connected to a second end of the second winding on the second cylinder, a first end of the first winding on the second cylinder is connected to the second input end, a first end of the second winding on the second cylinder is connected to the output end, and dotted terminals of the first end of the first winding and the first end of the second winding on the first cylinder are the second end of the first winding and the second end of the second winding on the second cylinder.

With reference to the first aspect, in a fourth possible implementation, the at least two magnetic cylinders include a first cylinder and a second cylinder, and the at least two input ends include a first input end and a second input end, where a first winding on the first cylinder and a first winding on the second cylinder are connected in parallel between the first input end and the output end, and a second winding on the first cylinder and a second winding on the second cylinder are connected in parallel between the second input end and the output end.

With reference to the fourth possible implementation, in a fifth possible implementation, a first end of the first winding on the first cylinder and a first end of the first winding on the second cylinder are connected to the first input end, a second end of the second winding on the first cylinder and a second end of the second winding on the second cylinder are connected to the second input end, a first end of the second winding on the first cylinder, a first end of the second winding on the second cylinder, a second end of the first winding on the first cylinder, and a second end of the first winding on the second cylinder are connected to the output end, and dotted terminals of the first end of the first winding and the first end of the second winding on the first cylinder are the first end of the first winding and the first end of the second winding on the second cylinder.

With reference to the first aspect, in a sixth possible implementation, the at least two magnetic cylinders include N cylinders, and the at least two input ends include N input ends; when n is an odd number, a second end of a first winding on an $n^{th}$ cylinder is connected to a second end of a first winding on an $(n+1)^{th}$ cylinder, and a first end of the first winding on the $n^{th}$ cylinder is connected to an $n^{th}$ input end; when n is an even number, a second end of a second winding on the $n^{th}$ cylinder is connected to a second end of a second winding on the $(n+1)^{th}$ cylinder, and a first end of the second winding on the $n^{th}$ cylinder is connected to the $n^{th}$ input end; when N is an odd number, a first end of a first winding on an $N^{th}$ cylinder is connected to the $N^{th}$ input end, and a second end of a second winding on the $N^{th}$ cylinder is connected to a second end of a first winding on the $1^{st}$ cylinder; when N is an even number, a first end of a second winding on the $N^{th}$ cylinder is connected to the $N^{th}$ input end, and a second end of a first winding on the $N^{th}$ cylinder is connected to a second end of a first winding on the $1^{st}$ cylinder; and N is an integer, and n=1, 2, 3, . . . , N−1.

With reference to the sixth possible implementation, in a seventh possible implementation, the N cylinders include a first cylinder, a second cylinder, and a third cylinder, the at least two input ends include a first input end, a second input end, and a third input end, a first end of a first winding on the first cylinder is connected to the first input end, a first end of a second winding on the second cylinder is connected to the second input end, a first end of a first winding on the third cylinder is connected to the third input end, a first end of a second winding on the first cylinder, a first end of a first winding on the second cylinder, and a first end of a second winding on the third cylinder are connected to the output end, a second end of the first winding on the first cylinder is connected to a second end of the first winding on the second cylinder, a second end of the second winding on the second cylinder is connected to a second end of the second winding on the third cylinder, and a second end of the first winding on the third cylinder is connected to a second end of the second winding on the first cylinder.

With reference to the first aspect or any one of the foregoing possible implementations, the at least two magnetic cylinders are mutually connected, and twining directions of the first winding and the second winding on each cylinder among the at least two magnetic cylinders are the same.

With reference to the first aspect or any one of the foregoing possible implementations, the number of turns of the first winding is the same as the number of turns of the second winding.

According to a second aspect, a power converter is provided, including: an input end; an output end; the coupled inductor according to any possible implementation of the first aspect, where an output end of the coupled inductor is coupled to the output end of the power converter; and at least two multi-level bridge arms, separately connected to at least two input ends of the coupled inductor, and configured to work in an parallel interleaving connection mode, and generate multiple time-varying levels on an alternating current node of each multi-level bridge arm among the at least two multi-level bridge arms.

With reference to the second aspect, in a first possible implementation, the power converter of the second aspect further includes: a drive circuit, configured to generate a drive signal, and control the at least two multi-level bridge arms to work in a phase staggered mode.

With reference to the second aspect or the first possible implementation, in a second possible implementation, the power converter of the second aspect further includes: a filter circuit, connected to the output end of the coupled inductor, and configured to perform filtration on an alternating current; and a bleeder circuit, connected to the input end of the power converter, and configured to perform voltage dividing on a direct current.

In technical solutions of the embodiments of the present invention, two windings may be twined in parallel on each cylinder of the coupled inductor, and connections of the two windings twined in parallel on each cylinder to at least two input ends and an output end of the coupled inductor are set to make a first winding and a second winding on each cylinder generate opposite magnetic potentials when currents that flow into the input ends are equal. In this way, the magnetic potentials generated by the currents offset each other, so that a magnetic leakage is reduced.

BRIEF DESCRIPTION OF THE DRAWINGS

To describe technical solutions in embodiments of the present invention more clearly, the following briefly introduces accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes technical solutions in embodiments of the present invention with reference to accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

Figure 1:
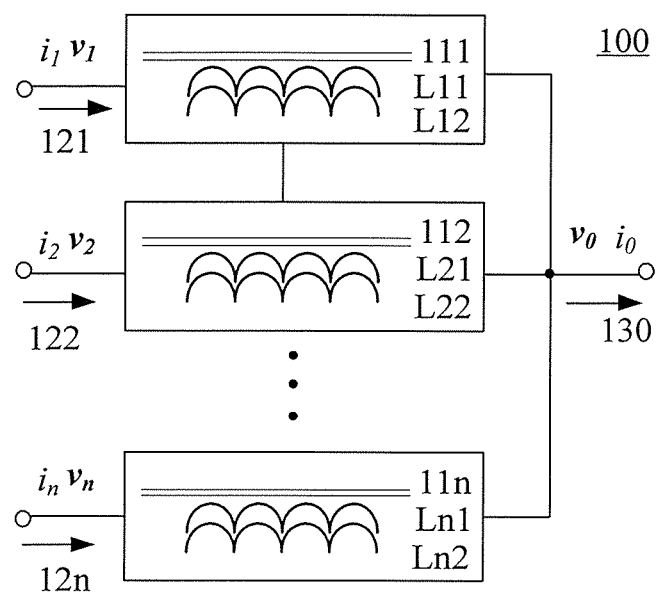
FIG. 1 is a schematic structural diagram of a coupled inductor according to an embodiment of the present invention.

FIG. 1 is a schematic structural diagram of a coupled inductor 100 according to an embodiment of the present invention.

The coupled inductor 100 includes: at least two input ends 121, 122, . . . , and 12n, an output end 130, a common magnetic core, at least two first windings L11, L21, . . . , and Ln1, and at least two second windings L12, L22, . . . , and Ln2. The common magnetic core includes at least two magnetic cylinders 111, 112, . . . , and 11n, and the number of the at least two magnetic cylinders 111, 112, . . . , and 11n corresponds to the number of the at least two input ends 121, 122, . . . , and 12n. One first winding and one second winding are twined in parallel on each cylinder among the at least two magnetic cylinders 121, 122, . . . , and 12n, and the first windings L11, L21, . . . , and Ln1 and the second windings L12, L22, . . . , and Ln2 on the at least two magnetic cylinders are mutually connected between the at least two input ends 121, 122, . . . , and 12n and the output end 130 to form mutually coupled inductances and make the first windings L11, L21, . . . , and Ln1 and the second windings L12, L22, . . . , and Ln2 on each cylinder generate opposite magnetic potentials when currents that flow into the at least two input ends 121, 122, . . . , and 12n are equal.

Specifically speaking, the at least two input ends of the coupled inductor 100 separately receive an alternating current output by, for example, a power converter, as an input. For example, the first input end 121 of the coupled inductor 100 receives an input whose voltage is $V_1$ and current is $i_1$, the second input end 122 receives an input whose voltage is $V_2$ and current is $i_2$, and the $n^{th}$ input end 12n receives an input whose voltage is $V_n$ and current is $i_n$; and the output end 130 of the coupled inductor 100 outputs a voltage $v_o$ and a current $i_o$ to a load. The at least two magnetic cylinders 111, 112, . . . , and 11n that are included in the common magnetic core may be mutually coupled, so that a magnetic flux generated on each cylinder can circulate on each cylinder. The first input end 121 corresponds to the first cylinder 111, and the first winding L11 and the second winding L12 are twined on the first cylinder 111; the second input end 122 corresponds to the second cylinder 112, and the first winding L21 and the second winding L22 are twined on the second cylinder 112; and by analogy, the $n^{th}$ input end 12n corresponds to the $n^{th}$ cylinder 11n, and the first winding Ln1 and the second winding Ln2 are twined on the $n^{th}$ cylinder 11n. The first windings L11, L21, . . . , and Ln1 and the second windings L12, L22, . . . and Ln2 are coupled between the output end 130 and both the first input end 121, the second input end 122, . . . and the $n^{th}$ input end 12n. For example, the first winding on each cylinder and the first winding on another cylinder are connected in series or in parallel between the input ends and the output end, and the second winding on each cylinder and the second winding on another cylinder are connected in series or in parallel between the input ends and the output end.

According to this embodiment of the present invention, two windings may be twined in parallel on each cylinder of the coupled inductor, and connections of the two windings twined in parallel on each cylinder to the at least two input ends and the output end of the coupled inductor are arranged in a way to make the first winding and the second winding on each cylinder generate opposite magnetic potentials when currents that flow into the input ends are equal. In this way, the magnetic potentials generated by common mode currents offset each other, so that a magnetic leakage is reduced.

According to this embodiment of the present invention, the at least two magnetic cylinders 110 are mutually connected, and twining directions of the first windings L11, L21, . . . and Ln1 and the second windings L12, L22, . . . and Ln2 on each cylinder among the at least two magnetic cylinders 110 are the same. For example, two magnetic yokes may be used to be separately connected to two ends of each cylinder, so as to form a square structure with mutual connections, and two windings on each cylinder may be twined in a same direction. In this way, a process of twining the windings can be simplified. In addition, connections of the windings are simplified. It should be understood that, the common magnetic core in this embodiment of the present invention is not limited to be the square structure, and may also be in a structure of another shape, for example, a polygon or a circle.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings In addition, normal running of a magnetic component around the coupled inductor such as a Hall effect sensor or a CT can be ensured.

It should be understood that, a wire-twining manner of the interleaving parallel coupled inductor without inductance leakage according to this embodiment of the present invention may be applied to a two-phase, three-phase, or multiphase coupled inductor, so that common mode magnetic potentials in the coupled inductor offset each other, and therefore inductance leakage of the designed coupled inductor is very small, which solves a problem caused by inductance leakage of the coupled inductor.

Figure 2:
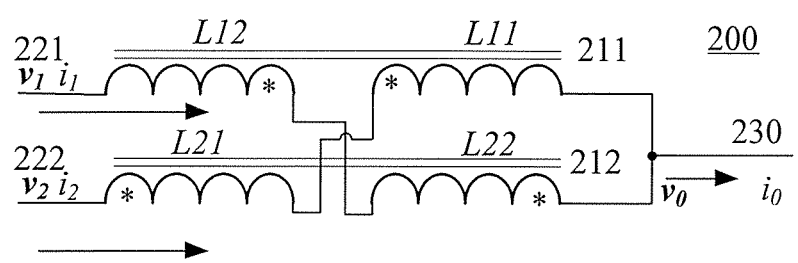
FIG. 2 is a schematic diagram illustrating an equivalent circuit diagram of a coupled inductor according to another embodiment of the present invention.
Figure 3:
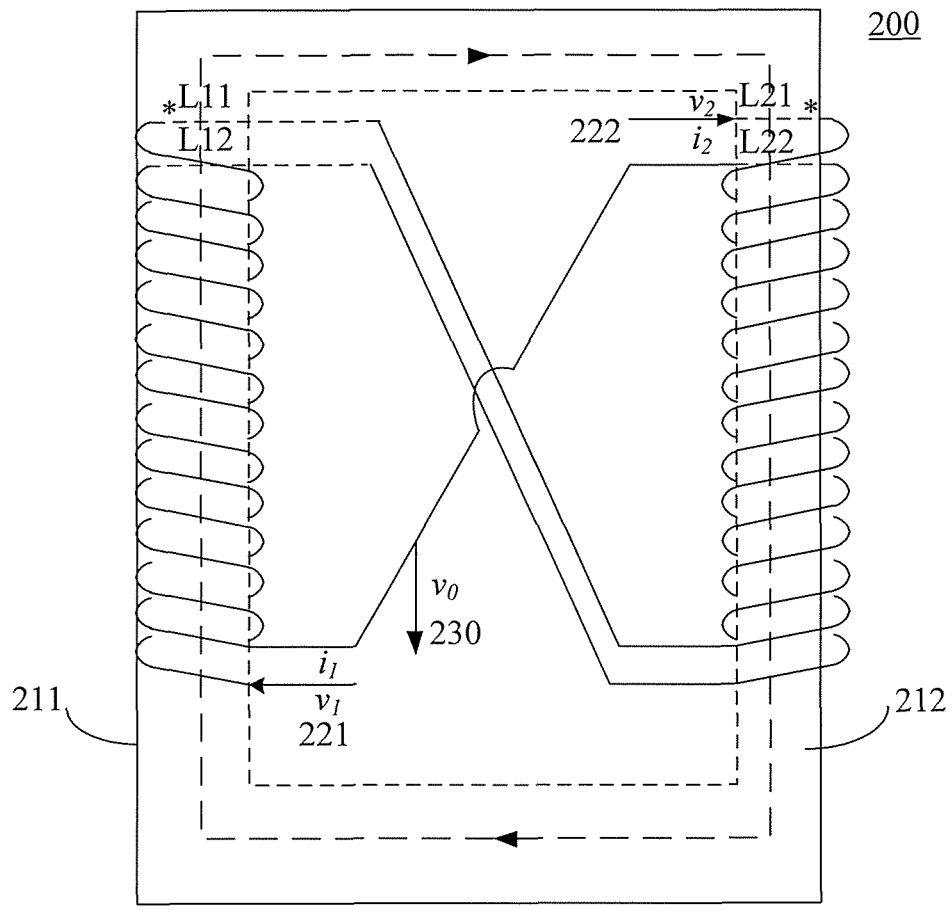
FIG. 3 is a schematic structural diagram of the coupled inductor in the embodiment of FIG. 2.

FIG. 2 is a schematic diagram illustrating an equivalent circuit diagram of a coupled inductor 200 according to another embodiment of the present invention. FIG. 3 is a schematic structural diagram of the coupled inductor 200 in the embodiment of FIG. 2. The coupled inductor 200 is an example of the coupled inductor 100, and detailed descriptions are omitted herein to a certain extent.

According to this embodiment of the present invention, at least two magnetic cylinders of the coupled inductor 200 include a first cylinder 211 and a second cylinder 212, and at least two input ends of the coupled inductor 200 include a first input end 221 and a second input end 222, where a first winding L11 on the first cylinder 211 and a first winding L21 on the second cylinder 212 are connected in series between the second input end 222 and an output end 230, and a second winding L12 on the first cylinder 211 and a second winding L22 on the second cylinder 212 are connected in series between the first input end 221 and the output end 230. The first winding L11 and the second winding L12 on the first cylinder 211 and the first winding L21 and the second winding L22 on the second cylinder 212 are arranged in the foregoing way to form mutually coupled inductances between the output end 230 and both the first input end 221 and the second input end 222 and make, when currents that flow into the first input end 221 and the second input end 222 are equal, the first winding L11 and the second winding L12 on the first cylinder 211 generate opposite magnetic potentials and the first winding L21 and the second winding L22 on the second cylinder 212 generate opposite magnetic potentials.

Specifically speaking, a first end of the first winding L11 on the first cylinder 211 is connected to a second end of the first winding L21 on the second cylinder 212, a second end of the first winding L11 on the first cylinder 211 is connected to the output end 230, a first end of the second winding L12 on the first cylinder 211 is connected to a second end of the second winding L22 on the second cylinder 212, a second end of the second winding L12 on the first cylinder 211 is connected to the first input end 221, a first end of the first winding L21 on the second cylinder 212 is connected to the second input end 222, a first end of the second winding L22 on the second cylinder 212 is connected to the output end 230, and dotted terminals of the first end of the first winding L11 and the first end of the second winding L12 on the first cylinder 211 are the first end of the first winding L21 and the first end of the second winding L22 on the second cylinder 212.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

Figure 4:
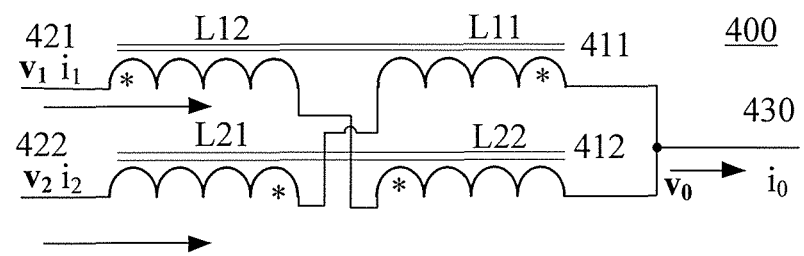
FIG. 4 is a schematic diagram illustrating an equivalent circuit diagram of a coupled inductor according to still another embodiment of the present invention.
Figure 5:
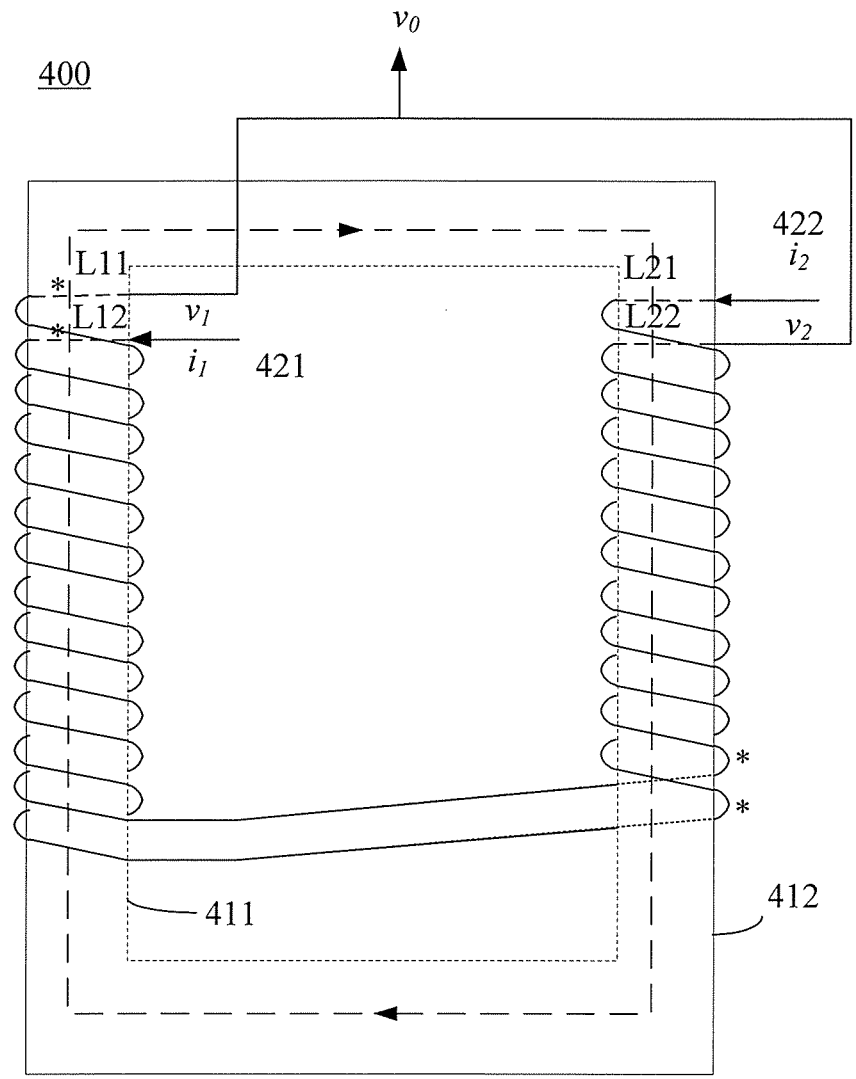
FIG. 5 is a schematic structural diagram of the coupled inductor in the embodiment of FIG. 4.

FIG. 4 is a schematic diagram illustrating an equivalent circuit diagram of a coupled inductor 400 according to still another embodiment of the present invention. FIG. 5 is a schematic structural diagram of the coupled inductor 400 in the embodiment of FIG. 4. The coupled inductor 400 is an example of the coupled inductor 100, and detailed descriptions are omitted herein to a certain extent.

According to this embodiment of the present invention, at least two magnetic cylinders of the coupled inductor 400 include a first cylinder 411 and a second cylinder 412, and at least two input ends include a first input end 421 and a second input end 422, where a first winding L11 on the first cylinder 411 and a first winding L21 on the second cylinder 412 are connected in series between the second input end 422 and an output end 430, and a second winding L12 on the first cylinder 411 and a second winding L22 on the second cylinder 412 are connected in series between the first input end 421 and the output end 430. The first winding L11 and the second winding L12 on the first cylinder 411 and the first winding L21 and the second winding L22 on the second cylinder 412 are arranged in the foregoing way to form mutually coupled inductances between the output end 430 and both the first input end 421 and the second input end 422 and make, when currents that flow into at least the first input end 421 and the second input end 422 are equal, the first winding L11 and the second winding L12 on the first cylinder 411 generate opposite magnetic potentials and the first winding L21 and the second winding L22 on the second cylinder 412 generate opposite magnetic potentials.

Specifically speaking, a first end of the first winding L11 on the first cylinder 411 is connected to the output end 430, a second end of the first winding L11 on the first cylinder 411 is connected to a second end of the first winding L21 on the second cylinder 412, a first end of the second winding L12 on the first cylinder 411 is connected to the first input end 421, a second end of the second winding L12 on the first cylinder 411 is connected to a second end of the second winding L22 on the second cylinder 412, a first end of the first winding L21 on the second cylinder 412 is connected to the second input end 422, a first end of the second winding L22 on the second cylinder 412 is connected to the output end 430, and dotted terminals of the first end of the first winding L11 and the first end of the second winding L12 on the first cylinder 411 are the second end of the first winding L21 and the second end of the second winding L22 on the second cylinder 412.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

Figure 6:
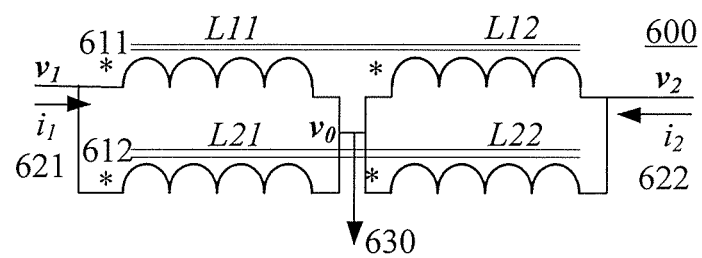
FIG. 6 is a schematic diagram illustrating an equivalent circuit diagram of a coupled inductor according to yet another embodiment of the present invention.
Figure 7:
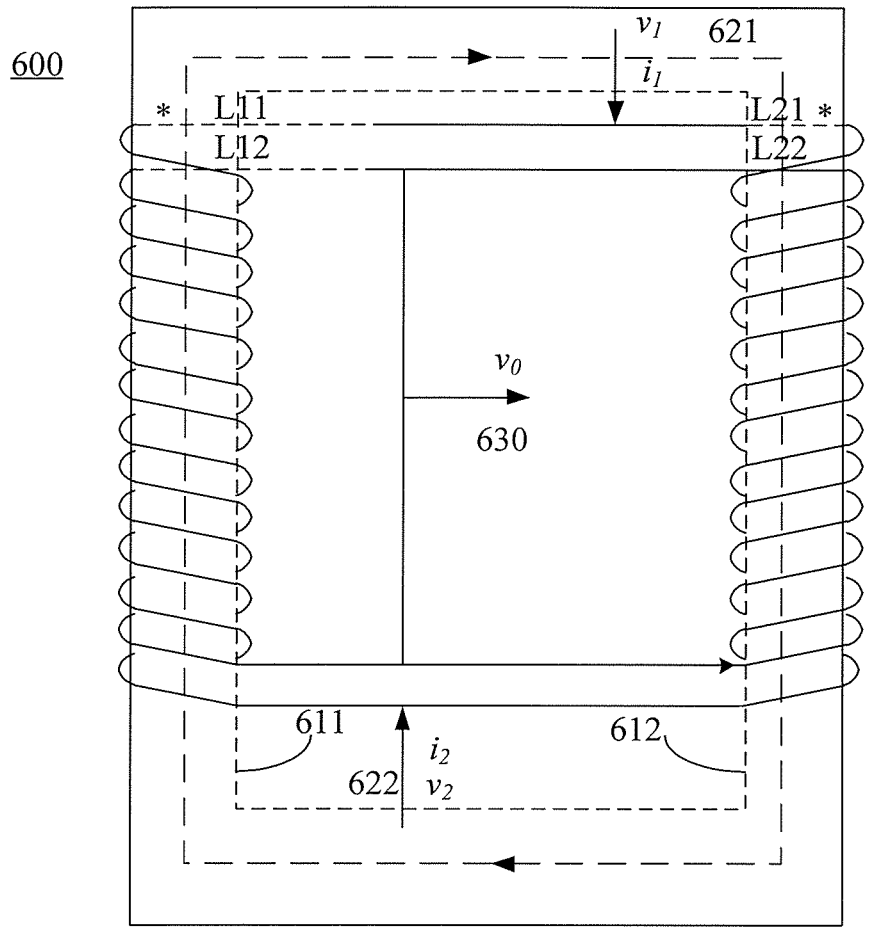
FIG. 7 is a schematic structural diagram of the coupled inductor in the embodiment of FIG. 6.

FIG. 6 is a schematic diagram illustrating an equivalent circuit diagram of a coupled inductor 600 according to yet another embodiment of the present invention. FIG. 7 is a schematic structural diagram of the coupled inductor 600 in the embodiment of FIG. 6. The coupled inductor 600 is an example of the coupled inductor 100, and detailed descriptions are omitted herein to a certain extent.

According to this embodiment of the present invention, at least two magnetic cylinders of the coupled inductor 600 include a first cylinder 611 and a second cylinder 612, and at least two input ends include a first input end 621 and a second input end 622, where a first winding L11 on the first cylinder 611 and a first winding L21 on the second cylinder 612 are connected in parallel between the first input end 621 and an output end 630, and a second winding L12 on the first cylinder 611 and a second winding L22 on the second cylinder 612 are connected in parallel between the second input end 622 and the output end 630. The first winding L11 and the second winding L12 on the first cylinder 611 and the first winding L21 and the second winding L22 on the second cylinder 612 are arranged in the foregoing way to form mutually coupled inductances between the output end 630 and both the first input end 621 and the second input end 622 and make, when currents that flow into at least the first input end 621 and the second input end 622 are equal, the first winding L11 and the second winding L12 on the first cylinder 611 generate opposite magnetic potentials and the first winding L21 and the second winding L22 on the second cylinder 612 generate opposite magnetic potentials.

Specifically speaking, a first end of the first winding L11 on the first cylinder 611 and a first end of the first winding L21 on the second cylinder 612 are connected to the first input end 621, a second end of the second winding L12 on the first cylinder 611 and a second end of the second winding L22 on the second cylinder 612 are connected to the second input end 622, a first end of the second winding L12 on the first cylinder 611, a first end of the second winding L22 on the second cylinder 612, a second end of the first winding L11 on the first cylinder 611, and a second end of the first winding L21 on the second cylinder 612 are connected to the output end 630, and dotted terminals of the first end of the first winding L11 and the first end of the second winding L12 on the first cylinder 611 are the first end of the first winding L21 and the first end of the second winding L22 on the second cylinder 612.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

Figure 8:
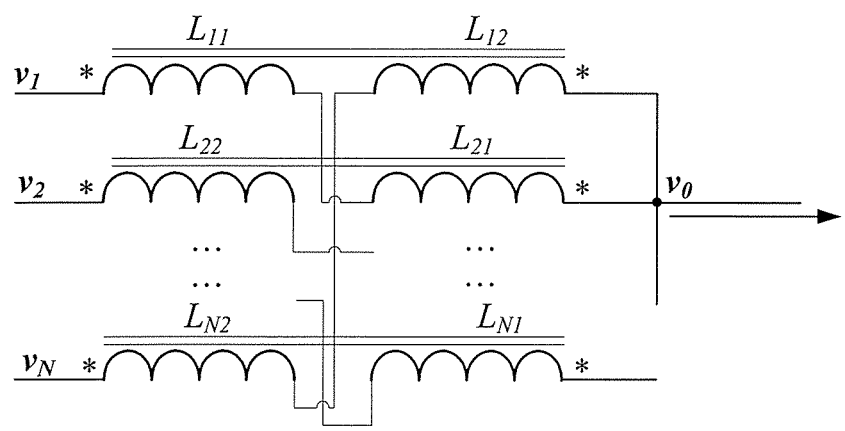
FIG. 8 is a schematic structural diagram of a coupled inductor according to another embodiment of the present invention.

FIG. 8 is a schematic structural diagram of a coupled inductor 800 according to another embodiment of the present invention. The coupled inductor 800 is an example of the coupled inductor 100, and detailed descriptions are omitted herein to a certain extent.

According to this embodiment of the present invention, at least two magnetic cylinders of the coupled inductor 800 include N cylinders, and the at least two input ends include N input ends, for example, input ends $V_1, V_2, \ldots,$ and $V_n$; when n is an odd number, a second end of a first winding on an $n^{th}$ cylinder is connected to a second end of a first winding on an $(n+1)^{th}$ cylinder, and a first end of the first winding on the $n^{th}$ cylinder is connected to the $n^{th}$ input end; when n is an even number, a second end of a second winding on the $n^{th}$ cylinder is connected to a second end of a second winding on the $(n+1)^{th}$ cylinder, and a first end of the second winding on the $n^{th}$ cylinder is connected to the $n^{th}$ input end; when N is an odd number, a first end of a first winding on the $N^{th}$ cylinder is connected to the $N^{th}$ input end, and a second end of a second winding on the $N^{th}$ cylinder is connected to a second end of a first winding on the $1^{st}$ cylinder; when N is an even number, a first end of a second winding on an $N^{th}$ cylinder is connected to the $N^{th}$ input end, and a second end of a first winding on the $N^{th}$ cylinder is connected to a second end of a first winding on the $1^{st}$ cylinder; and N is an integer, and n=1, 2, 3, . . . N−1. Twining directions of all windings on the at least two magnetic cylinders may be the same.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

Figure 9:
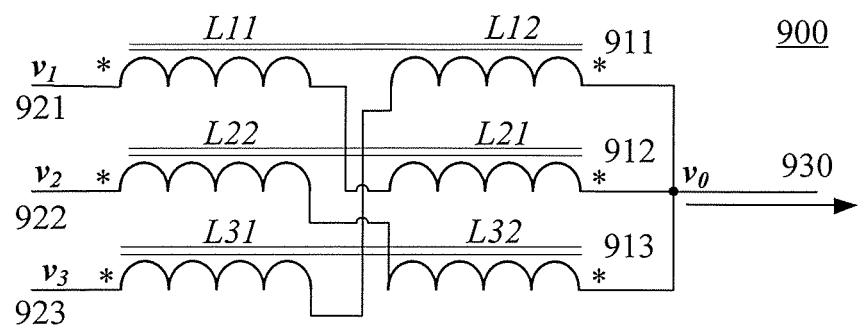
FIG. 9 is a schematic diagram illustrating an equivalent circuit diagram of a coupled inductor according to still another embodiment of the present invention.
Figure 10:
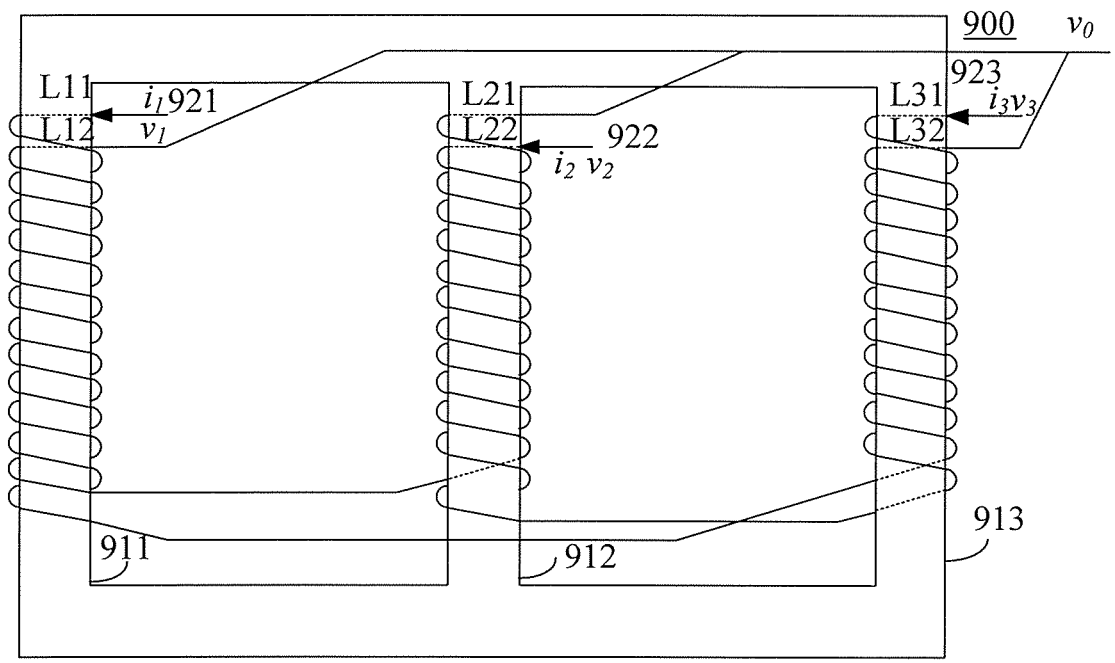
FIG. 10 is a schematic structural diagram of the coupled inductor in the embodiment of FIG. 9.

FIG. 9 is a schematic diagram illustrating an equivalent circuit diagram of a coupled inductor 900 according to still another embodiment of the present invention. FIG. 10 is a schematic structural diagram of the coupled inductor 900 in the embodiment of FIG. 9. The coupled inductor 900 is an example of the coupled inductor 100 and the coupled inductor 800, and detailed descriptions are omitted herein to a certain extent.

According to this embodiment of the present invention, the coupled inductor 900 includes a first cylinder 911, a second cylinder 912, and a third cylinder 913, at least two input ends include a first input end 921, a second input end 922, and a third input end 923, a first end of a first winding L11 on the first cylinder 911 is connected to the first input end 921, a first end of a second winding L22 on the second cylinder 912 is connected to the second input end 922, a first end of a first winding L31 on the third cylinder 913 is connected to the third input end 923, a first end of a second winding L12 on the first cylinder 911, a first end of a first winding L21 on the second cylinder 912, and a first end of a second winding L32 on the third cylinder 913 are connected to the output end 930, a second end of the first winding L11 on the first cylinder 911 is connected to a second end of the first winding L21 on the second cylinder 912, a second end of the second winding L22 on the second cylinder 912 is connected to a second end of the second winding L32 on the third cylinder 913, and a second end of the first winding L31 on the third cylinder 913 is connected to a second end of the second winding L12 on the first cylinder 911. The first winding L11 and the second winding L12 on the first cylinder 911, the first winding L21 and the second winding L22 on the second cylinder 912, and the first winding L31 and the second winding L32 on the third cylinder 913 are set to form mutually coupled inductances between the output end 930 and both the first input end 921, the second input end 922, and the third input end 923 and make, when currents that flow into at least the first input end 921, the second input end 922, and the third input end 923 are equal, the first winding L11 and the second winding L12 on the first cylinder 911 generate opposite magnetic potentials, the first winding L21 and the second winding L22 on the second cylinder 912 generate opposite magnetic potentials, and the first winding L31 and the second winding L32 on the second cylinder 913 generate opposite magnetic potentials.

According to this embodiment of the present invention, the coupled inductor maybe set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

Figure 11:
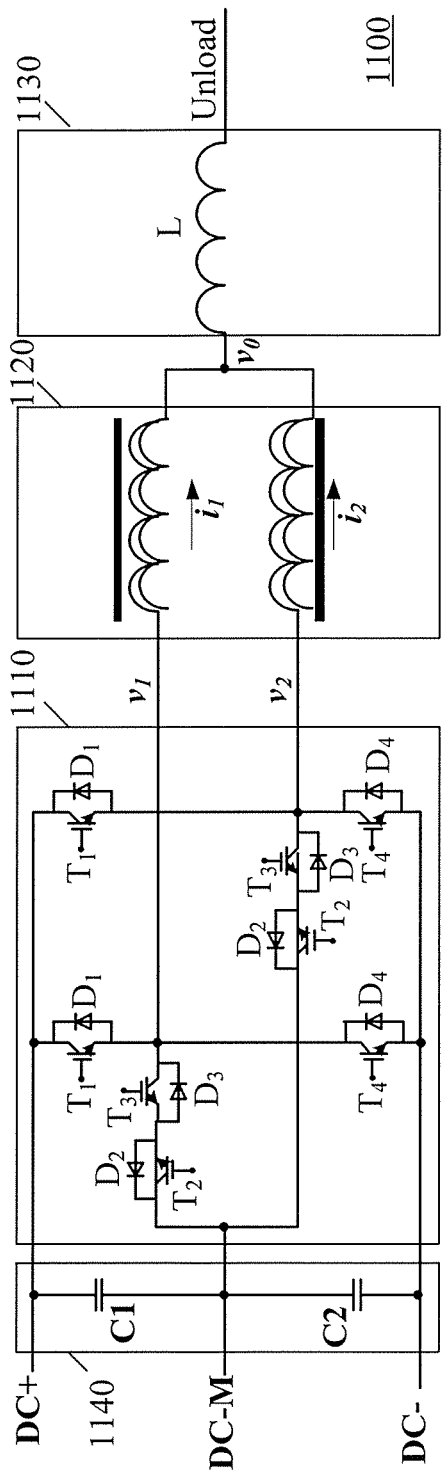
FIG. 11 is a schematic structural diagram of a power converter according to an embodiment of the present invention.

FIG. 11 is a schematic structural diagram of a power converter 1100 according to an embodiment of the present invention. The power converter 1100 includes: an input end, an output end, the coupled inductor according to the foregoing embodiments, and at least two multi-level bridge arms.

An output end of a coupled inductor 1120 is coupled to the output end of the power converter 1100; and at least two multi-level bridge arms 1110 are separately connected to at least two input ends of the coupled inductor 1120, and configured to work in an parallel interleaving connection mode, and generate multiple time-varying levels on an alternating current node of each multi-level bridge arm among the at least two multi-level bridge arms 1110.

In the example of the two multi-level bridge arms 1110, each multi-level bridge arm may include: a switch transistor T1, a diode D1, a switch transistor T2, a diode D2, a switch transistor T3, a diode D3, a switch transistor T4, and a diode D4.

According to this embodiment of the present invention, the coupled inductor may be set such that the number of turns of the first winding is the same as the number of turns of the second winding. In this way, common mode magnetic potentials with same magnitudes and opposite directions can be generated in the two windings, and the common mode magnetic potentials generated in the first winding and the second winding offset each other as much as possible, so that magnetic leakage is reduced as far as possible. This in turn reduces an eddy current loss caused in the windings by the magnetic leakage, and eliminates a stray loss caused in a metal part outside the windings. In addition, normal running of a magnetic component around the coupled inductor such as a Hall effect sensor or a CT can be ensured.

In the example of FIG. 11, there are two five-level bridge arms, and this embodiment of the present invention is not limited thereto. The coupled inductor in this embodiment of the present invention may be connected to multiple multi-level bridge arms, and each multi-level bridge arm corresponds to one input end of the coupled inductor.

Optionally, as another embodiment, the power converter 1100 further includes: a drive circuit (not shown). The drive circuit is configured to generate a drive signal, and control the at least two multi-level bridge arms to work in a phase staggered mode. The drive circuit may be connected to gates of switch transistors of the multi-level bridge arm, and configured to drive the switch transistors to be turned on and off according to a preset switch cycle.

Optionally, as another embodiment, the power converter 1100 further includes: a filter circuit 1130 and a bleeder circuit 1140. The filter circuit 1130 is connected to the output end of the coupled inductor 1120, and configured to perform filtration on an alternating current. The bleeder circuit 1140 is connected to the input end of the power converter 1100, and configured to perform voltage dividing on a direct current.

The bleeder circuit 1140 includes two capacitors C1 and C2 that are connected in parallel, where C1 is connected between a positive input end DC+ and a midpoint DC-M, and C2 is connected between a negative input end DC− and the midpoint DC-M.

The filter circuit 1130 includes an inductor L. Optionally, the filter circuit 1130 may further include a capacitor that is connected in parallel to the inductor L.

A person of ordinary skill in the art may be aware that, with reference to the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

In the several embodiments provided in the present application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. Further, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A coupled inductor, comprising:
at least two input ends, an output end, a common magnetic core, at least two first windings, and at least two second windings;
wherein the common magnetic core comprises at least two magnetic cylinders, and the number of the at least two magnetic cylinders corresponds to the number of the at least two input ends;
one first winding and one second winding are twined in parallel on each cylinder among the at least two magnetic cylinders, and the first windings and the second windings on the at least two magnetic cylinders are mutually connected between the at least two input ends and the output end to form mutually coupled inductances and when currents that flow into the at least two input ends are equal, such that the first winding and the second winding on each cylinder generate opposite magnetic potentials;
wherein the at least two magnetic cylinders comprise a first cylinder and a second cylinder; and
the at least two input ends comprise a first input end and a second input end, wherein the first winding on the first cylinder and the first winding on the second cylinder are connected in parallel between the first input end and the output end, and the second winding on the first cylinder and the second winding on the second cylinder are connected in parallel between the second input end and the output end.

2. The coupled inductor according to claim 1, wherein:
the first winding on the first cylinder and the first winding on the second cylinder are connected in series between the second input end and the output end, and the second winding on the first cylinder and the second winding on the second cylinder are connected in series between the first input end and the output end.

3. The coupled inductor according to claim 2, wherein:
a first end of the first winding on the first cylinder is connected to a second end of the first winding on the second cylinder;
a second end of the first winding on the first cylinder is connected to the output end;
a first end of the second winding on the first cylinder is connected to a second end of the second winding on the second cylinder;
a second end of the second winding on the first cylinder is connected to the first input end;
a first end of the first winding on the second cylinder is connected to the second input end;
a first end of the second winding on the second cylinder is connected to the output end; and
the first end of the first winding and the first end of the second winding on the first cylinder have a same polarity as the first end of the first winding and the first end of the second winding on the second cylinder.

4. The coupled inductor according to claim 2, wherein:
a first end of the first winding on the first cylinder is connected to the output end;
a second end of the first winding on the first cylinder is connected to a second end of the first winding on the second cylinder;
a first end of the second winding on the first cylinder is connected to the first input end;
a second end of the second winding on the first cylinder is connected to a second end of the second winding on the second cylinder;
a first end of the first winding on the second cylinder is connected to the second input end;
a first end of the second winding on the second cylinder is connected to the output end; and
dotted terminals of the first end of the first winding and the first end of the second winding on the first cylinder are the second end of the first winding and the second end of the second winding on the second cylinder.

5. The coupled inductor according to claim 1, wherein:
a first end of the first winding on the first cylinder and a first end of the first winding on the second cylinder are connected to the first input end;
a second end of the second winding on the first cylinder and a second end of the second winding on the second cylinder are connected to the second input end;
a first end of the second winding on the first cylinder, a first end of the second winding on the second cylinder;
a second end of the first winding on the first cylinder, and a second end of the first winding on the second cylinder are connected to the output end; and
dotted terminals of the first end of the first winding and the first end of the second winding on the first cylinder are the first end of the first winding and the first end of the second winding on the second cylinder.

6. The coupled inductor according to claim 1, wherein:
the at least two magnetic cylinders comprise N cylinders, and the at least two input ends comprise N input ends;
when n is an odd number, a second end of the first winding on an nth cylinder is connected to a second end of the first winding on an (n+1)th cylinder, and a first end of the first winding on the nth cylinder is connected to an nth input end;
when n is an even number, a second end of the second winding on the nth cylinder is connected to a second end of the second winding on the (n+1)th cylinder, and a first end of the second winding on the nth cylinder is connected to the nth input end;

when N is an odd number, a first end of the first winding on the Nth cylinder is connected to the Nth input end, and a second end of the second winding on the Nth cylinder is connected to a second end of the first winding on the 1st cylinder;
when N is an even number, a first end of the second winding on the Nth cylinder is connected to the Nth input end, and a second end of the first winding on the Nth cylinder is connected to a second end of the first winding on the 1st cylinder; and
N is an integer, and n=1, 2, 3, . . . , N−1.

7. The coupled inductor according to claim 6, wherein:
the N cylinders comprise a first cylinder, a second cylinder, and a third cylinder;
the at least two input ends comprise a first input end, a second input end, and a third input end;
a first end of the first winding on the first cylinder is connected to the first input end;
a first end of the second winding on the second cylinder is connected to the second input end;
a first end of the first winding on the third cylinder is connected to the third input end;
a first end of the second winding on the first cylinder, a first end of the first winding on the second cylinder and a first end of the second winding on the third cylinder are connected to the output end; and
a second end of the first winding on the first cylinder is connected to a second end of the first winding on the second cylinder, a second end of the second winding on the second cylinder is connected to a second end of the second winding on the third cylinder, and a second end of the first winding on the third cylinder is connected to a second end of the second winding on the first cylinder.

8. The coupled inductor according to claim 1, wherein the at least two magnetic cylinders are mutually connected, and twining directions of the first winding and the second winding on each cylinder among the at least two magnetic cylinders are the same.

9. The coupled inductor according to claim 1, wherein the number of turns of the first winding is the same as the number of turns of the second winding.

10. A power converter, comprising:
an input end;
an output end;
a coupled inductor, comprising:
at least two input ends, an output end, a common magnetic core, at least two first windings, and at least two second windings;
wherein the common magnetic core comprises at least two magnetic cylinders, and the number of the at least two magnetic cylinders corresponds to the number of the at least two input ends;
one first winding and one second winding are twined in parallel on each cylinder among the at least two magnetic cylinders, and the first windings and the second windings on the at least two magnetic cylinders are mutually connected between the at least two input ends and the output end to form mutually coupled inductances and when currents that flow into the at least two input ends are equal, such that the first winding and the second winding on each cylinder generate opposite magnetic potentials;
wherein the at least two magnetic cylinders comprise a first cylinder and a second cylinder; and
the at least two input ends comprise a first input end and a second input end, wherein the first winding on the first cylinder and the first winding on the second cylinder are connected in parallel between the first input end and the output end, and the second winding on the first cylinder and the second winding on the second cylinder are connected in parallel between the second input end and the output end;

wherein an output end of the coupled inductor is coupled to the output end of the power converter; and at least two multi-level bridge arms, separately connected to at least two input ends of the coupled inductor, and configured to work in an parallel interleaving connection mode, and generate multiple time-varying levels on an alternating current node of each multi-level bridge arm among the at least two multi-level bridge arms.

11. The power converter according to claim 10, further comprising:

a filter circuit, connected to the output end of the coupled inductor, and configured to perform filtration on an alternating current; and a bleeder circuit, connected to the input end of the power converter, and configured to perform voltage dividing on a direct current.

* * * * *